United States Patent
Kamiyama et al.

(10) Patent No.: US 8,287,339 B2
(45) Date of Patent: Oct. 16, 2012

(54) GAME DEVICE, GAME DEVICE CONTROL METHOD, AND INFORMATION STORAGE MEDIUM

(75) Inventors: Keisuke Kamiyama, Tokyo (JP); Minoru Tanokura, Tokyo (JP); Takuya Hashimoto, Chiba (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 493 days.

(21) Appl. No.: 12/434,187

(22) Filed: May 1, 2009

(65) Prior Publication Data

US 2009/0280878 A1    Nov. 12, 2009

(30) Foreign Application Priority Data

May 9, 2008    (JP) .................................. 2008-123580

(51) Int. Cl.
*A63F 9/24* (2006.01)
(52) U.S. Cl. .......................................................... 463/1
(58) Field of Classification Search ........................ None
See application file for complete search history.

(56) References Cited

FOREIGN PATENT DOCUMENTS

| JP | 9-182876 A | 7/1997 |
|---|---|---|
| JP | 11267355 A1 | 10/1999 |
| JP | 2006094919 A1 | 4/2006 |

OTHER PUBLICATIONS

Korean Office Action corresponding to Korean Patent Application No. 10-2009-0028581, dated Nov. 9, 2010.
Office Action dated Feb. 8, 2012 in Taiwanese Patent Application No. 098104598.

*Primary Examiner* — David E Graybill
(74) *Attorney, Agent, or Firm* — Sughrue Mion, PLLC

(57) ABSTRACT

To provide a game device capable of preventing a player wishing to progress through a game from feeling frustrated, while ensuring that excitement of a game that progresses based on an actual date, an actual day of the week, and/or an actual time is not deteriorated. When a game starts, a setting unit (84) sets a game day of the week and/or a game time, based on the actual day of the week and/or time. An update unit (86) advances the game day of the week and/or time, based on an operation carried out by a player. A game control unit (88) controls progress of the game, based on the actual date and the game day of the week and/or time.

12 Claims, 6 Drawing Sheets

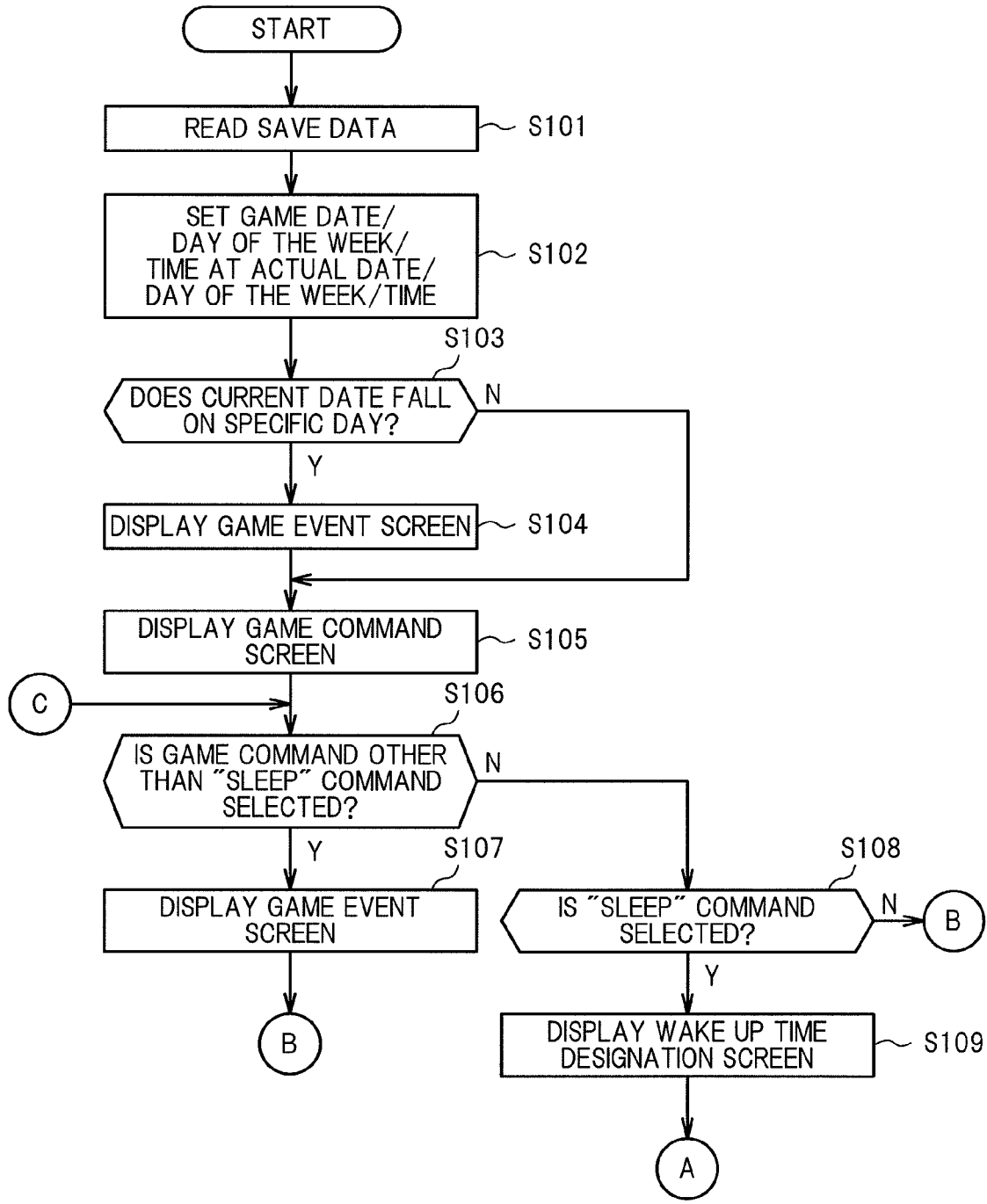

GAME DEVICE, GAME DEVICE CONTROL METHOD, AND INFORMATION STORAGE MEDIUM

CROSS-REFERENCE TO RELATED APPLICATION

The present application claims priority from Japanese application JP 2008-123580 filed on May 9, 2008, the content of which is hereby incorporated by reference into this application.

BACKGROUND OF THE INVENTION

1. Field of the Invention

The present invention relates to a game device, a game device control method, and an information storage medium.

2. Description of the Related Art

There is known a game device that has a calendar function and a clock function. In such a game device, a game that progresses based on an actual date, day of the week, and/or time, utilizing the calendar and clock functions, is carried out (as disclosed in, e.g., JP09-182876A). For example, a game in which a game event corresponding to an actual date occurs and/or a game in which a player enjoys communication with a game character acting based on an actual day of the week and/or time are/is carried out.

SUMMARY OF THE INVENTION

In the above described game, as a game does not progress unless the actual date, day of the week, and/or time advance, a player wishing to progress through a game may feel frustrated. In the above described game, it is necessary to prevent a player wishing to progress through a game from feeling frustrated. Moreover, in such a case, it is necessary to ensure that excitement of a game that progresses based on the actual date, day of the week, and/or time is not deteriorated.

The present invention has been conceived in view of the above, and an object thereof is to provide a game device, a game device control method, and an information storage medium capable of preventing a player wishing to progress through a game from feeling frustrated, while ensuring that excitement of a game that progresses based on the actual date, day of the week, and/or time is not deteriorated.

In order to achieve the above described object, according to one aspect of the present invention, there is provided a game device for carrying out a game, comprising an obtaining unit for obtaining an actual date, an actual day of the week, and an actual time; a storage unit for storing information indicating a game day of the week and/or a game time; a setting unit for setting, in the case where the game starts, the game day of the week and/or the game time, based on the actual day of the week and/or the actual time; an update unit for advancing the game day of the week and/or the game time, based on an operation carried out by a player; and a game control unit for controlling progress of the game, based on the actual date, the game day of the week, and/or the game time.

Also, according to another aspect of the present invention, there is provided a method for controlling a game device for carrying out a game, comprising an obtaining step of obtaining an actual date, an actual day of the week, and an actual time; a step of reading content stored in a storage unit for storing information indicating a game day of the week and/or a game time; a setting step of setting, in the case where the game starts, the game day of the week and/or the game time, based on the actual day of the week and/or the actual time; a update step of advancing the game day of the week and/or the game time, based on an operation carried out by a player; and a game control step of controlling progress of the game, based on the actual date, the game day of the week, and/or the game time.

Also, according to still another aspect of the present invention, there is provided a program for causing a computer, such as an installation-type game device (a consumer game device), a portable game device, a commercial game device, a portable phone, a personal digital assistant (PDA), a personal computer, or the like, to function as a game device for carrying out a game, the program causing the computer to function as an obtaining unit for obtaining an actual date, an actual day of the week, and an actual time; a unit for reading content stored in a storage unit for storing information indicating a game day of the week and/or a game time; a setting unit for setting, in the case where the game starts, the game day of the week and/or the game time, based on the actual day of the week and/or the actual time; an update unit for advancing the game day of the week and/or the game time, based on an operation carried out by a player; and a game control unit for controlling progress of the game, based on the actual date, the game day of the week, and/or the game time.

An information storage medium according to the present invention is a computer readable information storage medium storing the above described program.

According to the present invention, it is possible to prevent a player wishing to progress through a game from feeling frustrated, while ensuring that excitement of a game that progresses based on the actual date, day of the week, and/or time is not deteriorated.

In one embodiment of the present invention, the storage unit may store information indicating a difference between the game time and the actual time as information indicating the game time.

In another embodiment of the present invention, the storage unit may store information indicating the game day of the week and the game time, the setting unit may set the game day of the week and the game time, based on the actual day of the week and the actual time, and the update unit may include a unit for advancing the game time, based on the operation carried out by the player, a unit for determining, in the case where the game time is advanced based on the operation carried out by the player, whether or not the game time has passed a reference time, and a unit for updating, in the case where it is determined that the game time has passed the reference time, the game day of the week to a following day of the week.

In still another embodiment of the present invention, the game control unit may include a unit for causing a first game event to occur, based on the actual date, and a unit for causing a second game event to occur, based on the game day of the week and/or the game time.

BRIEF DESCRIPTION OF THE DRAWINGS

FIG. 10 is a diagram showing one example of content stored in a game date/day of the week/time storage unit;

FIG. 11 is a flowchart of a process to be carried out on a game device; and

DETAILED DESCRIPTION OF THE INVENTION

In the following, one example of an embodiment of the present invention will be described in detail with reference to the accompanying drawings.

Figure 1:
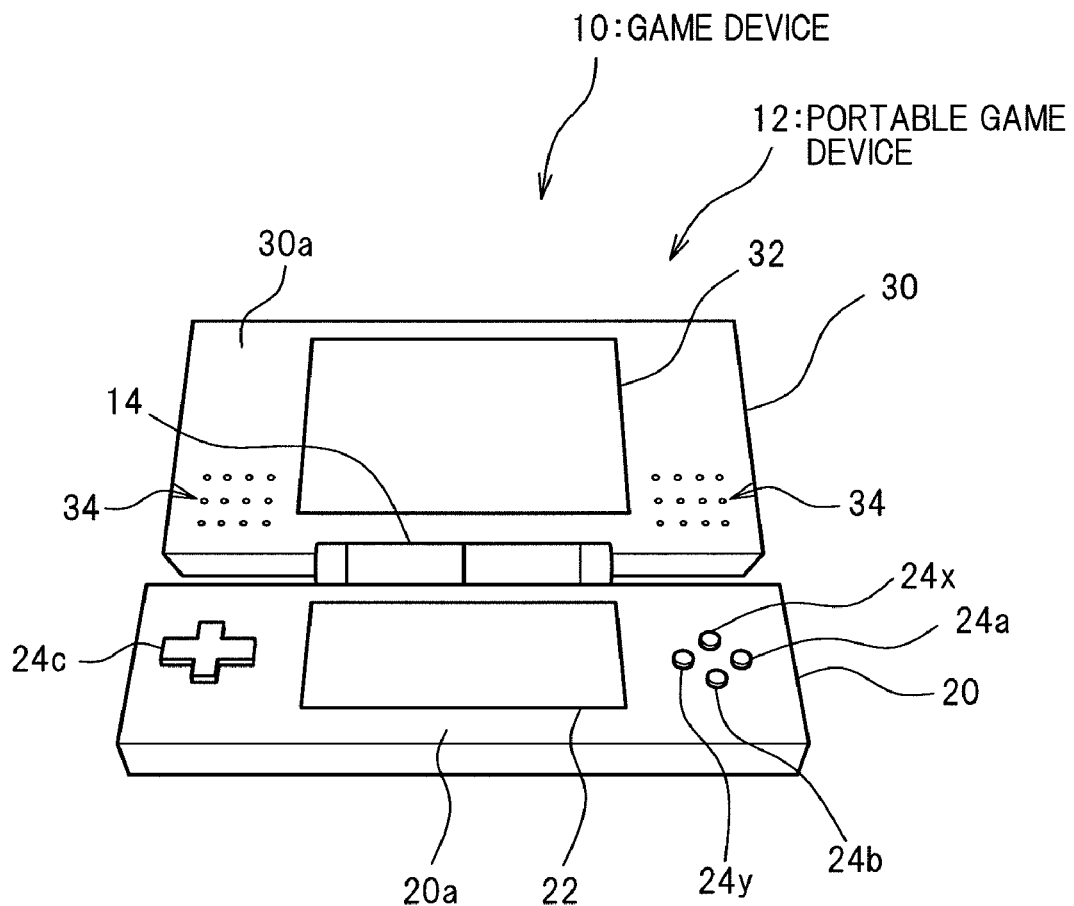
FIG. 1 is a perspective view showing external appearance of a game device according to an embodiment of the present invention.
Figure 2:
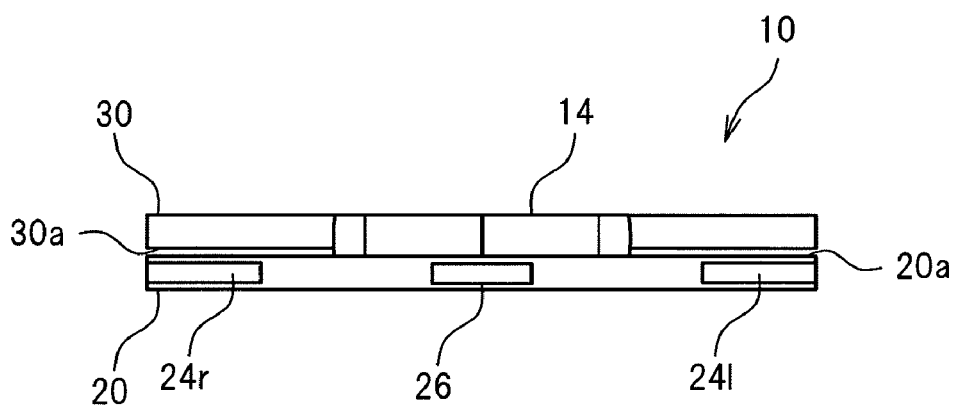
FIG. 2 is a rear elevation showing external appearance of the game device according to this embodiment.
Figure 3:
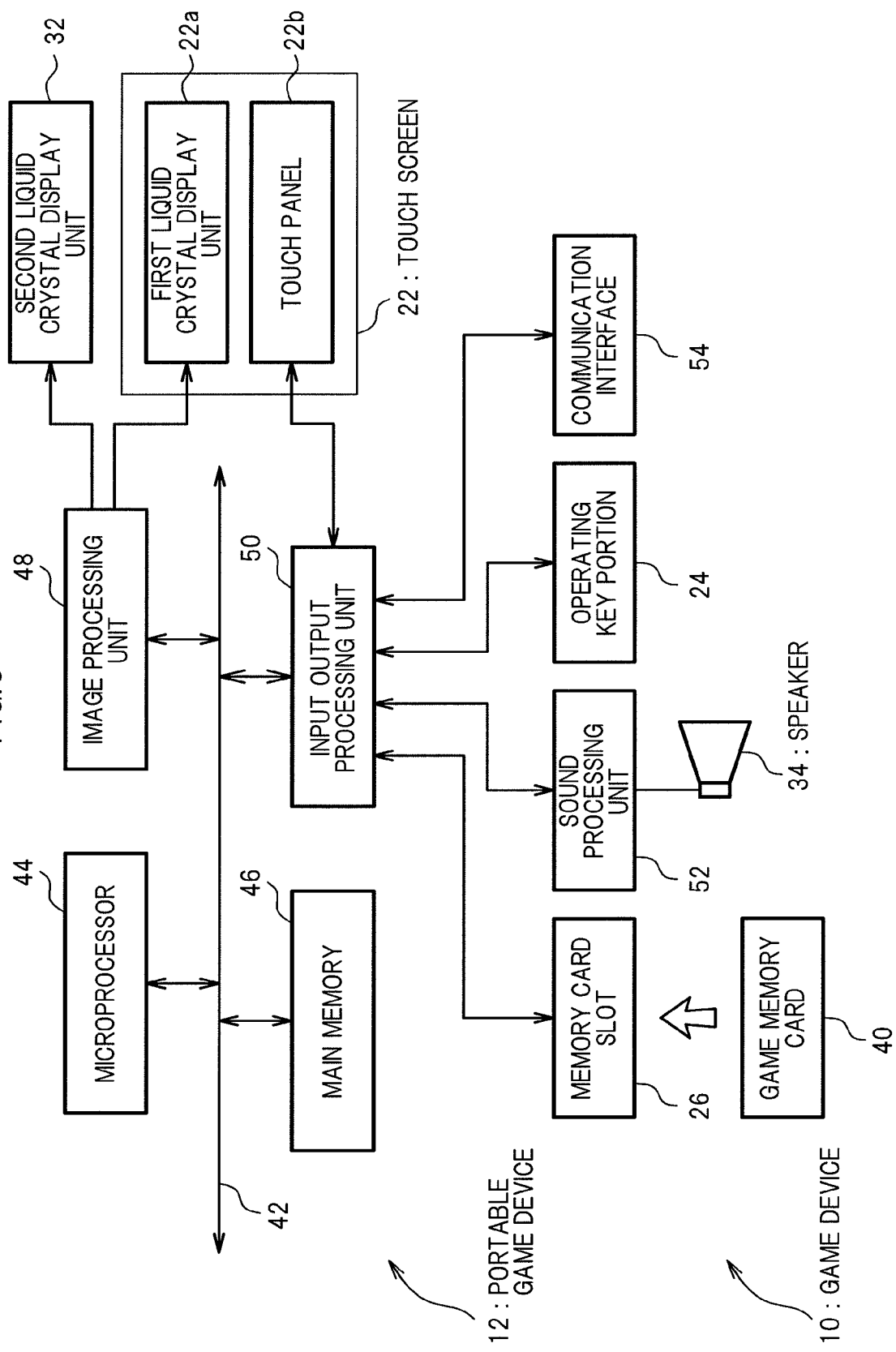
FIG. 3 is a diagram showing a hardware structure of the game device according to this embodiment.

FIGS. 1 and 2 show external appearance of a game device 10 according to an embodiment of the present invention. FIG. 3 shows a hardware structure of the game device 10 according to the embodiment. In the following, a case in which a portable game device 12 is used to realize a game device 10 according to an embodiment of the present invention will be described. Note that a game device 10 according to an embodiment of the present invention can also be realized using an installation-type game device (a consumer game device), a commercial game device, a portable phone, a personal digital assistant (PDA), or a personal computer.

FIG. 1 is a perspective view of the game device 10 viewed from the front side thereof. As shown in FIG. 1, the game device 10 comprises a first enclosure 20 and a second enclosure 30, both being connected to each other via a hinge 14. On the surface 20a of the first enclosure 20, there are provided a touch screen 22, a cross button 24c, and buttons 24a, 24b, 24x, 24y. The touch screen 22 includes a first liquid crystal display unit 22a and a touch panel 22b placed over the first liquid crystal display unit 22a (see FIG. 3). The cross button 24c is used, e.g., to instruct a direction. The buttons 24a, 24b, 24x, 24y are used to perform various operations. On the surface 30a of the second enclosure 30, there is provided a second liquid crystal display unit 32. The second enclosure 30 has a built-in speaker 34.

FIG. 2 is a rear elevation view of the game device 10 in a folded position (the surface 20a of the first enclosure 20 is placed on the surface 30a of the second enclosure 30). As shown in FIG. 2, the buttons 24l, 24r are provided on the left and right ends, respectively, of the rear-side lateral surface of the first enclosure 20. Further, a memory card slot 26 for accepting a game memory card 40 (see FIG. 3), or an information storage medium, is formed at the middle portion on the rear-side lateral surface of the first enclosure 20. Other members, such as a power supply switch (not shown) or the like, are connected to the game device 10.

As shown in FIG. 3, the game device 10 comprises a touch screen 22 (the first liquid crystal display unit 22a and touch panel 22b), an operating key portion 24, a memory card slot 26, a second liquid crystal display unit 32, a speaker 34, a bus 42, a microprocessor 44, a main memory 46, an image processing unit 48, an input output processing unit 50, a sound processing unit 52, and a communication interface 54, all of which, as well as a battery (not shown), are accommodated in an enclosure and driven by the battery.

The microprocessor 44 controls the respective units of the game device 10, based on an operating system stored in a ROM (not shown) and a program and data stored in the game memory card 40. The main memory 46 comprises, e.g., a RAM. A program read from the memory card 40 is written into the main memory 46 upon necessity. The main memory 46 is used also as a working memory of the microprocessor 44. The bus 42 is used to exchange address and data among the respective units of the game device 10. The microprocessor 44, main memory 46, image processing unit 48, and input output processing unit 50 are connected for data exchange via the bus 42.

The first liquid crystal display unit 22a and second liquid crystal display unit 32 are each formed using a publicly known liquid crystal display panel. The image processing unit 48 includes a VRAM. The image processing unit 48 renders an image into the VRAM according to an instruction from the microprocessor 44. The image rendered into the VRAM is displayed at a predetermined time on the first liquid crystal display unit 22a or second liquid crystal display unit 32.

The input output processing unit 50 is an interface for use by the microprocessor 44 to exchange data with the touch panel 22b, operating key portion 24, memory card slot 26, sound processing unit 52, and communication interface 54. The touch panel 22b, operating key portion 24, memory card slot 26, sound processing unit 52, and communication interface 54 are connected to the input output processing unit 50.

The operating key portion 24 is an input means for use by a user to input an operation. The operating key portion 24 comprises a cross button 24c and buttons 24a, 24b, 24x, 24y, 24l, 24r. The input output processing unit 50 scans the states of the respective units of the operating key portion 24 every constant cycle (e.g., every $1/60^{th}$ of a second), and outputs an operational signal indicating a scanning result to the microprocessor 44 via the bus 42. The microprocessor 44 determines the content of an operation carried out by a user, based on the operational signal. The touch panel 22b also is an input means for use by a user to input an operation. The touch panel 22b provides pressed position information in accordance with a position pressed by a user to the microprocessor 44 via the input output processing unit 50. The microprocessor 44 determines the position pressed by the user, based on the pressed position information.

The memory card slot 26 reads a game program and game data stored in the game memory card 40 according to an instruction from the microprocessor 44. The game memory card 40 includes a ROM to store a game program and game data and an EEPROM to store game data such as e.g., save data or the like. A game is realized in the game device 10 by carrying out a game program stored in the game memory card 40. Note that although a game memory card 40 is used here to provide a game program and game data to the game device 10, other information storage medium, such as an optical disc or the like, may be used instead. A game program and game data may be provided via a communication network, such as the Internet or the like, from a remote place to the game device 10. Various data communications, such as infrared-ray communication or the like, may be used to provide a game program and game data to the game device 10.

The sound processing unit 52 includes a sound buffer. The sound processing unit 52 outputs via the speaker 34 various sound data read from the game memory card 40 into the sound buffer. The communication interface 54 is an interface for connecting the game device 10 to the communication network.

The game device 10 further comprises a calendar unit and a clock unit. The calendar unit holds an actual date and an actual day of the week, while the clock unit holds an actual time.

In the game device 10 having the above-described structure, a game in which a player communicates with a game character is carried out. In this game, a player aims to enhance closeness between a player character that is a main game character and a game character that is a communication partner (hereinafter referred to as "a partner character").

Figure 4:
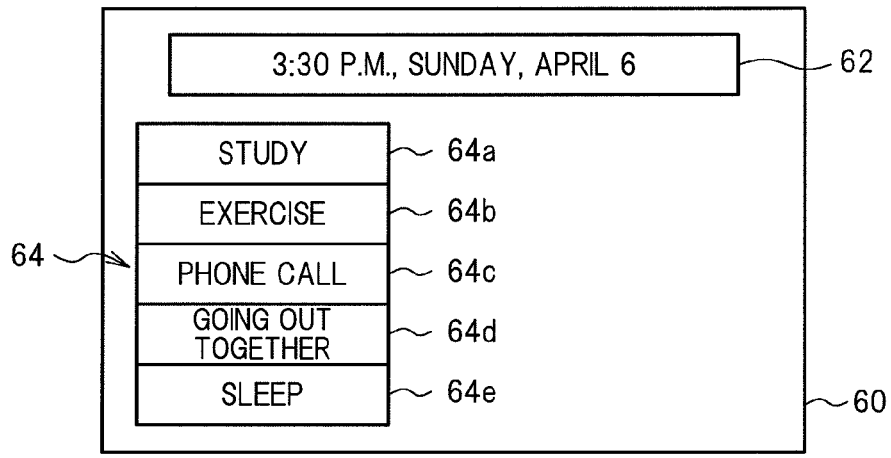
FIG. 4 is a diagram showing one example of a game command screen.

FIG. 4 shows one example of a game screen. A game command screen 60 shown in FIG. 4 is a game screen for encouraging a player to select an action of the player character. The game command screen 60 is shown on the touch screen 22. A background image that portrays a place where the player character is located, and/or a partner character, may be shown in the game command screen 60, which, however, are not shown here.

As shown in FIG. 4, the game command screen 60 has a game situation column 62, in which a date, a day of the week, and a time which are effective in a game (hereinafter referred to as a game date, a game day of the week, and a game time) are shown.

In the following, a game date, a game day of the week, and a game time will be described. A game date, a game day of the week, and a game time are set at the actual date, actual day of the week, and actual time when a game starts (or a game is activated). The game time advances as the actual time advances. That is, as the actual time advances by one second, the game time also advances by one second. As the actual date and actual day of the week change, the game date and game day of the week also change.

A partner character acts, based on the game day of the week and game time. An action pattern for the partner character is determined in advance. For example, the partner character is present at school on a weekday from 8 a.m. to 4 p.m., and does a part time job on, e.g., Saturday from 1 p.m. to 8 p.m.

In the case where a game date (that is, the actual date) falls on a specific day, a game event corresponding to the specific day occurs. For example, on February $14^{th}$ according to the game time, a "St. Valentine Day" event occurs. On, e.g., December $24^{th}$ according to the game time, a "Christmas eve" event occurs. On, e.g., a birthday of the game character or partner character according to the game date, a "birthday" event occurs. With occurrence of a "St. Valentine Day", "Christmas eve", or "birthday" event, a closeness parameter indicating an extent of closeness between the player character and partner character increases.

A background image shown in a game screen, such as the game command screen 60 or the like, will change, based on the game date, game day of the week, and game time. For example, the background image is set in accordance with a season corresponding to the game date. Clothes of the partner character shown in the game screen, such as the game command screen 60, are also changed according to the game date, game day of the week, and game time.

As shown in FIG. 4, the game command screen 60 further has a game command group 64. The game command group 64 includes a plurality of game commands to be designated by a player to thereby instruct an action of the player character. The game command group 64 shown in FIG. 4 includes a "study" command 64a, an "exercise" command 64b, a "phone call" command 64c, a "going out together" command 64d, and a "sleep" command 64e. A player selects a game command by pressing the displayed area of that game command. With any game command selected by a player, a game event corresponding to the selected game command occurs.

The "study" command 64a or "exercise" command 64b is a game command for causing the player character to study or exercise. With the "study" command 64a selected, a study event occurs, upon which, e.g., an intelligence parameter of the player character increases. Meanwhile, with the "exercise" command 64b selected, an exercise event occurs, upon which, e.g., an exercise parameter of the player character increases. The values of the intelligence parameter and exercise parameter of the player character affect the value of the closeness parameter for the player character and partner character. For example, for a partner character that prefers an intelligent person, increase of the intelligence parameter of the player character leads to increase of the closeness parameter for the player character and partner character.

The "phone call" command 64c is a game command for causing the player character to make a phone call to the partner character. With the "phone call" command 64c selected, a game event in which the player character talks with the partner character on the phone occurs. In this game event, a player selects lines to be addressed by the player character to the partner character. In the case where a player selects appropriate lines determined in advance, the closeness parameter for the player character and partner character increases. Meanwhile, in the case where a player selects other lines, the closeness parameter for the player character and partner character decreases.

The "going out together" command 64d is a game command for causing the player character to go out with the partner character. With the "going out together" command 64d selected, a game event in which the player character goes out with the partner character occurs, upon which the closeness parameter for the player character and partner character increases.

The "sleep" command 64e is a game command for causing the player character to sleep until a designated time, with details of the "sleep" command 64e being described later.

The game command group 64 varies, based on the game day of the week and game time. In other words, selection of at least some of the game commands is restricted, based on the game day of the week and game time.

For example, the "phone call" command 64c is shown in the game command screen 60 during a night time band (8 p.m. to 12 p.m.) on a weekday (Monday to Friday) and a time band other than midnight (0 a.m. to 6 a.m.) on a day-off (Saturday, Sunday, and a holiday). Further, the "phone call" command 64c is not shown in the game command screen 60 during a time band (1 p.m. to 8 p.m. on Saturday) during which the partner character does a part time job.

For example, the "going out together" command 64d is shown in the game command screen 60 on a day-off except during a night time band (8 p.m. to 12 p.m.) and a midnight time band (0 a.m. to 6 a.m.). The "going out together" command 64d is also not shown during a time band (1 p.m. to 8 p.m. on Saturday) during which the partner character does a part time job.

Figure 5:
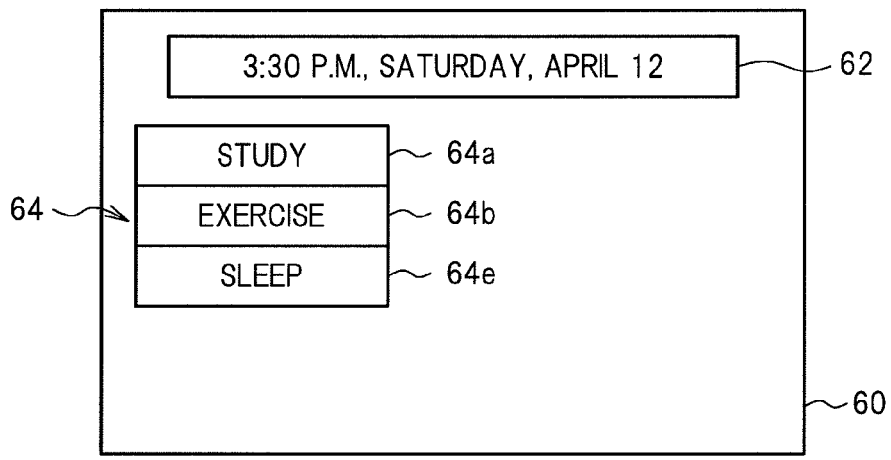
FIG. 5 is a diagram showing one example of a game command screen.

FIG. 5 shows one example of the game command screen 60 to be shown in the case where the game date (that is, the actual date) is "April $12^{th}$" and the game day of the week is "Saturday" and the game date is "3:30 p.m.". During this time period on Saturday, as the partner character does a part time job, the "phone call" command 64c and "going out together" command 64d are not shown in the game command screen 60 shown in FIG. 5.

Here, in the case where the game time and day of the week are the same as the actual time and day of the week, a player cannot select the "phone call" command 64c and "going out together" command 64d until the actual time and day of the week advance to a time band with these commands being displayed. This may be frustrating for a player who wishes to progress through the game. Regarding this point, the game device 10 prevents such a player from feeling frustrated. In the following, this function will be described.

In the game device 10, the "sleep" command 64e is available for a player wishing to progress through a game. That is, with the "sleep" command 64e selected by a player, a wake up time designation screen for designating a wake up time is displayed.

Figure 6:
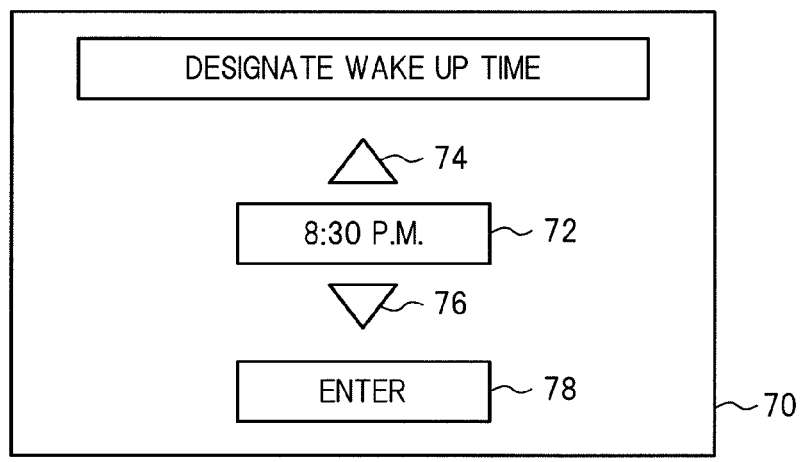
FIG. 6 is a diagram showing one example of a wake up time designation screen.

FIG. 6 shows one example of the wake uptime designation screen. As shown in FIG. 6, the wake up time designation screen 70 includes a wake up time column 72, an increase button 74, a decrease button 76, and an enter button 78. A wake up time is shown in the wake up time column 72. Every pressing of the increase button 74 by a player leads to advancement of the wake up time shown in the wake up time column 72 by ten minutes, and every pressing of the decrease button 76 by a player leads to turning back of the wake up time shown in the wake up time column 72 by ten minutes. The player can designate as a wake up time any time between the current game time and a game time up to twenty-three hours after the current game time. With the enter button 78 pressed by a player, e.g., a black screen is shown, upon which the player character begins sleeping. Thereafter, together with an alarm sound being output, a screen showing the player character waking up is displayed, followed by display of the game command screen 60.

Suppose that, e.g., a player selects the "sleep" command 64e in the game screen shown in FIG. 5, with designation of a wake up time at a time (8:30 p.m.) five hours after the current time. Accordingly, the game time is advanced to 8:30 p.m., as shown in the game command screen 60 shown in FIG. 7. As the time 8:30 p.m. on Saturday is in a time band during which the game character can make a phone call to the partner character, the "phone call" command 64c is displayed in the game command screen 60 to thereby become available for selection by a player.

Figure 7:
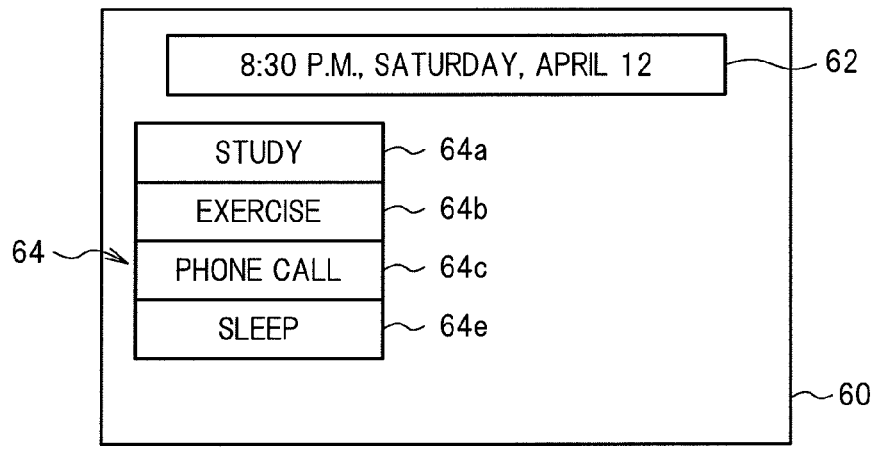
FIG. 7 is a diagram showing one example of a game command screen.

In the case where a player selects the "sleep" command 64e in FIG. 7 with designation as a wake up time at a time (8:30 a.m.) twelve hours after the current time, the game time is advanced to 8:30 a.m. In this case, as the game time has passed 12 p.m. (0 a.m.), the game day of the week is updated to the following day of the week. However, the game date is not updated to the following day in this case. That is, the game date and game day of the week are changed to "a Sunday in April", rather than "Sunday, April 13$^{th}$".

Figure 8:
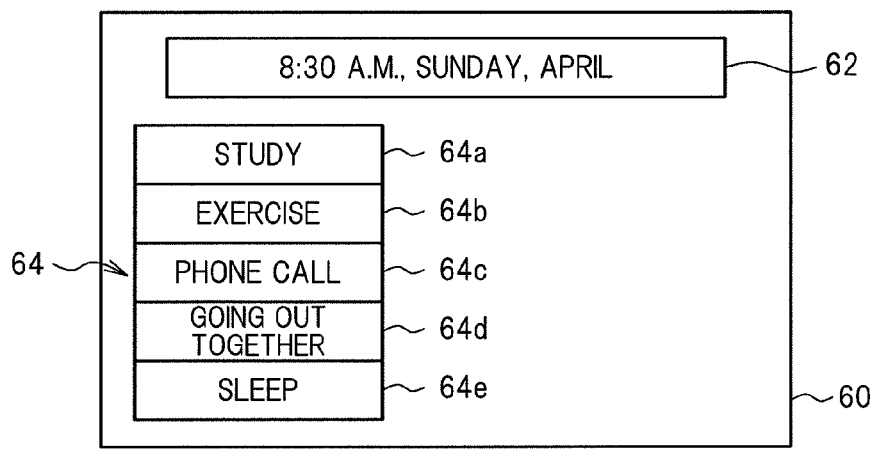
FIG. 8 is a diagram showing one example of a game command screen.

FIG. 8 shows one example of the game command screen 60 in this case. As shown in FIG. 8, only a month is shown in the game situation column 62, and a day is not displayed. That is, no specific date is shown. As the time 8:30 a.m. on Sunday is included in a time band during which the game character can make a phone call to or go out with the partner character, the "phone call" command 64c and "going out together" command 64d are displayed in the game command screen 60 to thereby become available for selection by a player.

As described above, a player wishing to progress through a game can advance the game time by utilizing the "sleep" command 64e. This can prevent a player wishing to progress through a game from feeling frustrated.

Meanwhile, the game date, game day of the week, and game time remain the same as the actual date, actual day of the week, and actual time unless a player utilizes the "sleep" command 64e. This ensures that a player other than a player wishing to progress through a game can enjoy "a communication game with a game character" that progresses based on the actual date, actual day of the week, and actual time.

In the case where the game time has passed 0 a.m. as the game time is advanced by a player utilizing the "sleep" command 64e, the game day of the week is updated to the following day of the week, but the game date is not updated to the following day. With the above, a game event which occurs on a specific day (e.g., a "Christmas eve" event) will not occur until the actual date becomes the specific day. This ensures that a player wishing to progress through a game also can enjoy "a communication game with a game character" that progresses based on the actual date, actual day of the week, and actual time.

Figure 9:
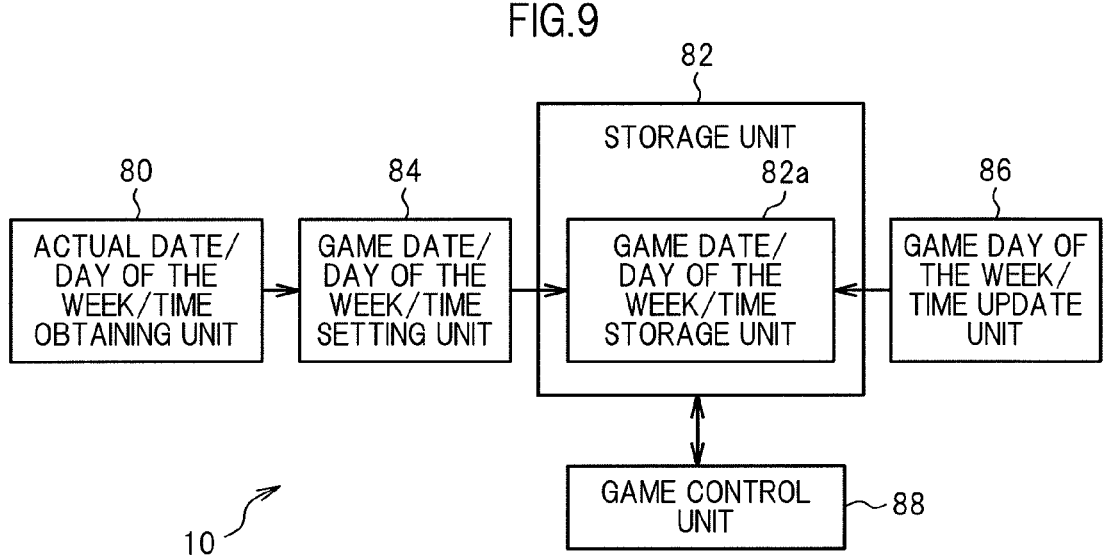
FIG. 9 is a functional block diagram of the game device according to this embodiment.

In the following, a functional block for realizing the above described game will be described. FIG. 9 is a functional block diagram showing functions according to the present invention among those realized in the game device 10. As shown in FIG. 9, the game device 10 comprises an actual date/day of the week/time obtaining unit 80, a storage unit 82, a game date/day of the week/time setting unit 84, a game day of the week/time update unit 86, and a game control unit 88. These functional blocks are realized by the microprocessor 44 by carrying out a program.

The actual date/day of the week/time obtaining unit 80 is realized mainly using the microprocessor 44, calendar unit, and clock unit. The actual date/day of the week/time obtaining unit 80 obtains an actual date, an actual day of the week, and an actual time.

The storage unit 82 is realized mainly using the main memory 46 and an EEPROM included in the game memory card 40. The storage unit 82 stores various game data. For example, various parameters (e.g., an intelligence or physical strength parameter) about the player character or a closeness parameter for the player character and partner character is stored in the storage unit 82. For example, specific day data for correlating a specific day to a game event is also stored in the storage unit 82. Specific day data collates, e.g., a "St. Valentine Day" event to "February 14$^{th}$" and a "Christmas eve" event to "December 24$^{th}$". Display control data for the game command group 64 is also stored in the storage unit 82. Display control data is data that defines, for each game command, a game day of the week and a game time on which and at which the concerned game command ought to be displayed in the game command screen 60. A player cannot select a game command that is not displayed in the game command screen 60. That is, display control data can be considered as data that defines a game day of the week and a game time on which and at which a player can select the concerned game command. Besides the above, e.g., action pattern data for the partner character is stored in the storage unit 82. Action pattern data is data for correlating, e.g., a game day of the week and a game time with content of an action of the partner character.

The storage unit 82 includes a game date/day of the week/time storage unit 82a. The game date/day of the week/time storage unit 82a stores a game date, a game day of the week, and a game time. FIG. 10 shows content stored in the game date/day of the week/time storage unit 82a. As shown in FIG. 10, information indicating a game date, a game day of the week, and a game time is stored in the game date/day of the week/time storage unit 82a. Specifically, the difference between a game time and an actual time is stored as information indicating a game time (hereinafter referred to as "game time information"). For example, for the game time 8:30 p.m. and the actual time 3:30 p.m., "five hours" is stored as the game time information.

The game date/day of the week/time setting unit 84 is realized mainly using the microprocessor 44. The game date/day of the week/time setting unit 84 sets, when a game starts (when a game is activated), a game date, a game day of the week, and a game time, based on the actual date, actual day of the week, and actual time. In this embodiment, the game date, game day of the week, and game time are set as the same as the actual date, actual day of the week, and actual time. In this case, the game time information is set as "zero hour".

The game day of the week/time update unit 86 is realized mainly using the microprocessor 44. The game day of the week/time update unit 86 advances the game day of the week and/or game time, based on an operation carried out by a player. For example, the game day of the week/time update unit 86 advances the game time by an amount designated by the player. In this embodiment, in the case where the "sleep" command 64e is selected by a player, the game day of the week/time update unit 86 advances the game time to the wake up time designated by the player. In the case where the game time has passed a reference time (12 p.m. in this embodiment) as a result of the game time being advanced to the wake up time, the game day of the week/time update unit 86 updates the game day of the week to the following day of the week.

The game control unit 88 is realized mainly using the microprocessor 44. The game control unit 88 controls progress of a game, based on the actual date and the game day of the week and/or game time.

For example, the game control unit 88 causes a game event (a first game event) to occur based on the actual date. In this embodiment, the game control unit 88 determines whether or not the actual date falls on any of the specific days indicated by the above-described specific day data. When the actual date falls on a specific day, the game control unit 88 causes a game event corresponding to the specific day to occur.

Further, the game control unit 88 causes a game event (a second game event) to occur, based on, e.g., the game day of the week and game time. In this embodiment, the game control unit 88 sets the game command group 64, based on the game day of the week and game time, and then causes a game event corresponding to the game command selected by a player to occur.

Figure 12:
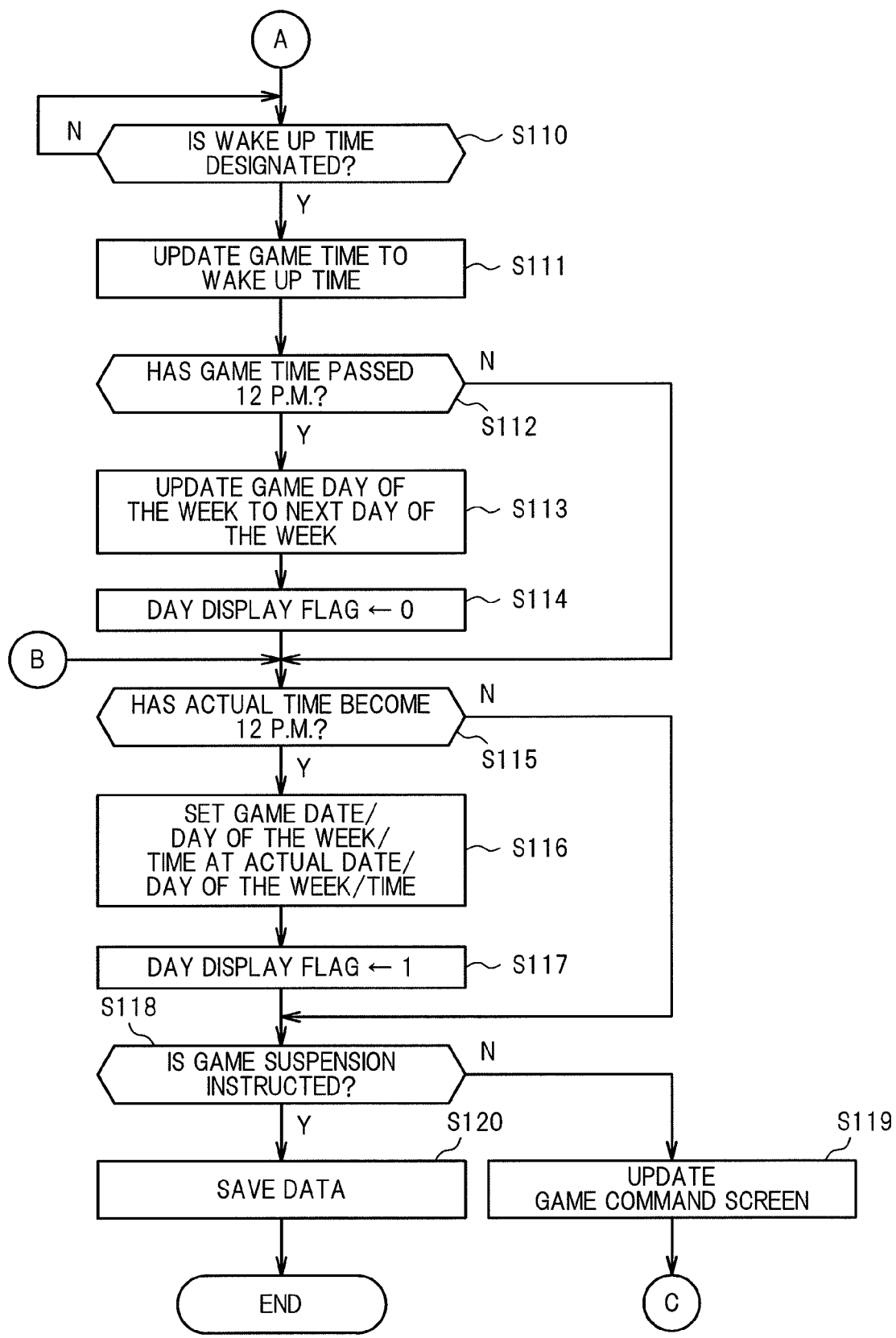
FIG. 12 is a flowchart of a process to be carried out on a game device.

In the following, a process for realizing the above-described functional block will be described. FIGS. 11 and 12 show a flowchart of a process concerning a game date, a game day of the week, and a game time among those carried out on the game device 10 after the game starts and before the game is suspended (ends). The microprocessor 44 carries out the process shown in FIGS. 11 and 12, following a program stored in the game memory card 40.

As shown in FIG. 11, the microprocessor 44 initially reads save data from the game memory card 40 (S101). The save data is data indicating the state of progress of a game at the time of last suspension (end) of the game. For example, the save data is data indicating the values of various parameters concerning the player character and/or the value of a closeness parameter for the player character and partner character, and so forth. At S101, where the save data is read, the state of progress of the game at the time of last suspension of the game is reproduced. Note that with no save data stored in the memory card 40, this process is not carried out.

Thereafter, the microprocessor 44 sets a game date, a game day of the week, and a game time (S102). In this case, the microprocessor 44 (the actual date/day of the week/time obtaining unit 80) obtains the actual date, actual day of the week, and actual time from the calendar unit and clock unit. Then, the microprocessor 44 (the game date/day of the week/time setting unit 84) sets a game date, a game day of the week, and a game time the same as the actual date, actual day of the week, and actual time, respectively. The game time information is set as "zero hour".

Thereafter, the microprocessor 44 (the game control unit 88) determines whether or not the current date falls on a specific day indicated by the specific day data (S103). For the current date falling on a specific day, the microprocessor 44 (the game control unit 88) displays a game event screen showing occurrence of a game event corresponding to the specific day (S104). For example, when the actual date falls on December $24^{th}$, a game event screen showing occurrence of a "Christmas eve" event is displayed. In the case where the game event screen is displayed, the value of the game parameter is increased or decreased, based on the content of the game event. For example, the value of the closeness parameter for the player character and partner character is increased or decreased.

After the processes at S103 and S104, the microprocessor 44 displays the game command screen 60 (S105). Then, the microprocessor 44 (the game control unit 88) determines whether or not any game command other than the "sleep" command 64e is selected by a player (S106). In the case where any game command other than the "sleep" command 64e is selected, the microprocessor 44 (the game control unit 88) displays a game event screen showing occurrence of a game event corresponding to the game command selected by a player (S107). For example, in the case where the "study" command 64a is selected by a player, a game event screen showing occurrence of a "study" event is displayed. In this case, the intelligence parameter of the player character is increased.

Meanwhile, in the case where no game command other than the "sleep" command 64e is selected by a player, the microprocessor 44 determines whether or not the "sleep" command 64e is selected by a player (S108). In the case where the "sleep" command 64e is selected, the microprocessor 44 displays the wake up time designation screen 70 (S109), and then monitors whether or not designation of a wake up time is completed (S110). That is, whether or not the enter button 78 is pressed by a player is determined.

With designation of the wake up time completed, the microprocessor 44 (the game day of the week/time update unit 86) updates the game time to the wake up time (S111), and then determines whether nor not the game time has passed 12 p.m. (0 a.m.) (S112). As the time 12 p.m. is present between the game time before the update and the game time after the update (or the wake up time), it is determined that the game time has passed 12 p.m. With determination that the game time has passed 12 p.m., the microprocessor 44 (the game day of the week/time update unit 86) updates the game day of the week to the following day of the week (S113). For example, when the game day of the week is Saturday, the game day of the week is updated to Sunday. Further, the microprocessor 44 updates a day display flag to 0 (S114). A day display flag is information indicating whether or not to display "day" in a game screen (e.g., in the game situation column 62 in the game command screen 60 or the like), and takes the value 0 or 1. In the case where the day display flag indicates 1, a "day" is displayed in the game screen (see FIGS. 4, 5, and 7). Meanwhile, in the case where the day display flag indicates 0, no "day" is displayed in a game screen, with a date therefore not specified (see FIG. 8). The day display flag is initialized to 1 when a game starts.

After the processes at S106 to S114, the microprocessor 44 determines whether or not the actual time has becomes 12 p.m. (0 a.m.) (S115). With the actual time being 12 p.m., the microprocessor 44 updates the game date, game day of the week, and game time to the actual date, actual day of the week, and actual time, respectively, (S116), and also updates the day display flag to 1 (S117). In the case where the player has advanced the game time (the game time information indicating other than "zero hour"), a message telling that "the game date, game day of the week, and game time are to be updated to the actual date, actual day of the week, and actual time as the actual time turns to 12 p.m." is displayed.

After the processes at S115 to S117, the microprocessor 44 determines whether or not suspension (end) of the game is instructed by a player (S118). In the case where suspension of the game is not instructed, the microprocessor 44 updates the game command screen 60 (S119). In the process at this step, e.g., information shown in the game situation column 62 is updated. Specifically, a time obtained by adding the time indicated by the game time information to the actual time is displayed as a game time shown in the game situation column 62. For the day display flag indicating 1, the game date (that is, the current date) and the game day of the week are displayed in the game situation column 62, and for the day display flag indicating 0, only the month of the game date (that is, the current date) and the game day of the week are displayed in the game situation column 62. In the process at this step, e.g., the game command group 64 is set, based on the game day of the week and game time and the display control data for the game command group 64. After update of the game command screen 60, the process at S106 and thereafter are carried out again.

Meanwhile, in the case where suspension of the game is instructed, the microprocessor 44 stores save data in the game memory card 40 (S120), upon which the game ends.

In the above described game device 10, a player can enjoy "a communication game with a game character" that progresses based on the actual date, day of the week, and time.

In addition, a player can advance the game time by utilizing the "sleep" command 64e in the game device 10. This can prevent a player wishing to progress through the game from feeling frustrated.

Meanwhile, the game date, game day of the week, and game time remain the same as the actual date, day of the week, and time unless a player utilizes the "sleep" command 64e in the game device 10. This can ensure that a player other than a player wishing to progress through a game can enjoy "a communication game with a game character" that progresses based on the actual date, day of the week, and time.

Further, even in the case where the player has advanced the game time by utilizing the "sleep" command 64e and the game time has resultantly passed 0 a.m., the game date is not updated to the following date in the game device 10 while the game day of the week is updated to the following day of the week. This arrangement can prevent a game event (e.g., a "Christmas eve" event) corresponding to a specific day from occurring until the actual date becomes the specific day. This ensure that a player wishing to progress through a game can also enjoy "a communication game with a game character" that progresses based on the actual date, day of the week, and time.

Here, note that the difference between the game time and actual time is stored as the game time information in the game device 10, and a time obtained by adding the difference stored as the game time information to the actual time is displayed as a game time in the game situation column 62 in the game command screen 60. As a result, the game time displayed in the game situation column 62 advances as the actual time advances. That is, when the actual time advances by one second, the game time displayed in the game situation column 62 also advances by one second. Note that a method is available in which a game time itself is stored as the game time information. However, a lighter process load results according to the present invention, compared to this method. That is, according to this method with a game time itself being stored, update of the game time information is required so that advancement of the actual time by one second leads to advancement of the game time by one second. Regarding this point, such requirement is not needed in this embodiment, and a process load is resultantly reduced.

It should be noted that the present invention is not limited to the above-described embodiment.

For example, a game command other than the "sleep" command 64e may be prepared as a game command for advancing the game time. For example, a "movie appreciation" command may be prepared as a game command for advancing the game time. In this case, with the "movie appreciation" command selected by a player, the game time may be advanced by two hours.

Note that, for example, as the game date stored in the game date/day of the week/time storage unit 82a is the same as the actual date in this embodiment, the game date/day of the week/time storage unit 82a may not store information indicating the game date. In this case, the actual day obtained by the actual date/day of the week/time obtaining unit 80 may be used as a game date as required.

Further, for example, either the game day of the week or the game time may be omitted. With, e.g., the game day of the week omitted, progress of a game may be controlled, based on the game date and time (the actual date and time). In this case, the partner character acts, based on the game time, and the game command group 64 is set, based on the game time. In this case, a player may be able to advance the game time.

Meanwhile, with the game time omitted, progress of a game may be controlled, based on the game date and day of the week (the actual date and day of the week). In this case, the partner character acts, based on the game day of the week, and the game command group 64 is set, based on the game day of the week. In this case, a player may be able to advance the game day of the week. That is, the "sleep" command 64e may serve as a game command for advancing a game day of the week in this case, and therefore upon selection of the "sleep" command 64e by a player, the game day of the week is updated to the following day of the week.

Still further, instead of the closeness parameter for the player character and partner character, an accumulated period of time during which the player character stays with the partner character may be stored. That is, an accumulated game period of time having passed thus far may be stored.

The present invention can be applied to a game device 10 which carries out a game other than a game for enjoying communication with a game character. That is, the present invention can be applied to a game device 10 which controls progress of a game, based on the actual date, day of the week, and/or time (the game date, day of the week, and/or time).

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for carrying out a game, comprising:
an obtaining unit for obtaining an actual date, an actual day of the week, and an actual time;
a storage unit for storing information indicating a game day of the week and/or a game time;
a setting unit for setting, in the case where the game starts, the game day of the week and/or the game time, based on the actual day of the week and/or the actual time;

an update unit for advancing the game day of the week and/or the game time, based on an operation carried out by a player; and a game control unit for controlling progress of the game, based on the actual date, the game day of the week, and/or the game time, wherein the update unit advances the game time by an amount designated by the player.

2. The game device according to claim 1, wherein the storage unit stores information indicating a difference between the game time and the actual time as information indicating the game time.

3. The game device according to claim 1, wherein the storage unit stores information indicating the game day of the week and the game time, the setting unit sets the game day of the week and the game time, based on the actual day of the week and the actual time, and the update unit includes a unit for advancing the game time, based on the operation carried out by the player, a unit for determining, in the case where the game time is advanced based on the operation carried out by the player, whether or not the game time has passed a reference time, and a unit for updating, in the case where it is determined that the game time has passed the reference time, the game day of the week to a following day of the week.

4. The game device according to claim 1, wherein the game control unit includes a unit for causing a first game event to occur, based on the actual date, and a unit for causing a second game event to occur, based on the game day of the week and/or the game time.

5. A method for controlling a game device having a processor and a memory, for carrying out a game, comprising:

obtaining by the processor an actual date, an actual day of the week, and an actual time;

reading content stored in a storage unit comprising the memory for storing information indicating a game day of the week and/or a game time;

setting by the processor, in the case where the game starts, the game day of the week and/or the game time, based on the actual day of the week and/or the actual time;

advancing by the processor the game day of the week and/or the game time, based on an operation carried out by a player; and controlling by the processor progress of the game, based on the actual date, the game day of the week, and/or the game time, wherein the game time is advanced by an amount designated by the player at the advancing.

6. A non-transitory computer readable information storage medium storing a program for causing a computer to function as a game device for carrying out a game, the program causing the computer to function as:

an obtaining unit for obtaining an actual date, an actual day of the week, and an actual time;

a unit for reading content stored in a storage unit for storing information indicating a game day of the week and/or a game time;

a setting unit for setting, in the case where the game starts, the game day of the week and/or the game time, based on the actual day of the week and/or the actual time;

an update unit for advancing the game day of the week and/or the game time, based on an operation carried out by a player; and a game control unit for controlling progress of the game, based on the actual date, the game day of the week, and/or the game time, wherein the update unit advances the game time by an amount designated by the player.

7. The method of claim 5, wherein the storage unit stores information indicating a difference between the game time and the actual time as information indicating the game time.

8. The method of claim 5, wherein the storage unit stores information indicating the game day of the week and the game time, the game day of the week and the game time is set based on the actual day of the week and the actual time at the setting, and the advancing includes advancing the game time, based on the operation carried out by the player, determining, in the case where the game time is advanced based on the operation carried out by the player, whether or not the game time has passed a reference time, and updating, in the case where it is determined that the game time has passed the reference time, the game day of the week to a following day of the week.

9. The method of claim 5, wherein the controlling includes causing a first game event to occur, based on the actual date, and causing a second game event to occur, based on the game day of the week and/or the game time.

10. The non-transitory computer readable information storage medium of claim 6, wherein the storage unit stores information indicating a difference between the game time and the actual time as information indicating the game time.

11. The non-transitory computer readable information storage medium of claim 6, wherein the storage unit stores information indicating the game day of the week and the game time, the setting unit sets the game day of the week and the game time, based on the actual day of the week and the actual time, and the update unit includes a unit for advancing the game time, based on the operation carried out by the player, a unit for determining, in the case where the game time is advanced based on the operation carried out by the player, whether or not the game time has passed a reference time, and a unit for updating, in the case where it is determined that the game time has passed the reference time, the game day of the week to a following day of the week.

12. The non-transitory computer readable information storage medium of claim 6, wherein the game control unit includes a unit for causing a first game event to occur, based on the actual date, and a unit for causing a second game event to occur, based on the game day of the week and/or the game time.

* * * * *